United States Patent
Huang et al.

(10) Patent No.: US 10,650,713 B2
(45) Date of Patent: May 12, 2020

(54) HEAD MOUNTED DISPLAY

(71) Applicant: Acer Incorporated, New Taipei (TW)

(72) Inventors: Shih-Ting Huang, New Taipei (TW); Wei-Kuo Shih, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 11 days.

(21) Appl. No.: 15/911,267

(22) Filed: Mar. 5, 2018

(65) Prior Publication Data
US 2019/0213933 A1 Jul. 11, 2019

(30) Foreign Application Priority Data

Jan. 5, 2018 (TW) .............................. 107100578 A

(51) Int. Cl.
| | |
|---|---|
| *G09G 3/00* | (2006.01) |
| *G06K 9/00* | (2006.01) |
| *G06K 9/20* | (2006.01) |
| *G06F 3/01* | (2006.01) |
| *G02B 7/02* | (2006.01) |

(52) U.S. Cl.
CPC ............. *G09G 3/003* (2013.01); *G02B 7/02* (2013.01); *G06F 3/013* (2013.01); *G06K 9/00604* (2013.01); *G06K 9/2018* (2013.01); *G09G 2320/028* (2013.01); *G09G 2354/00* (2013.01)

(58) Field of Classification Search
CPC .... G09G 3/003; G09G 2320/028; G02B 7/02; G06F 3/013; G06K 9/00604; G06K 9/2018
See application file for complete search history.

(56) References Cited

U.S. PATENT DOCUMENTS

| | | | |
|---|---|---|---|
| 2013/0300636 A1* | 11/2013 | Cunningham | G10L 13/02 345/8 |
| 2017/0123207 A1* | 5/2017 | Kress | G02B 27/0172 |
| 2017/0255015 A1 | 9/2017 | Geng et al. | |
| 2017/0316264 A1* | 11/2017 | Gustafsson | G06F 3/012 |
| 2017/0329398 A1* | 11/2017 | Raffle | G02B 27/0093 |
| 2019/0101757 A1* | 4/2019 | Martinez | G02B 27/0172 |

FOREIGN PATENT DOCUMENTS

| | | |
|---|---|---|
| CN | 106019587 A | 10/2016 |
| CN | 106796354 A | 5/2017 |
| WO | WO 2017/196403 A1 | 11/2017 |

* cited by examiner

*Primary Examiner* — Christopher J Kohlman
(74) *Attorney, Agent, or Firm* — Birch, Stewart, Kolasch & Birch, LLP

(57) ABSTRACT

A head mounted display includes a body portion, a display panel, a lens module, an infrared transmitter, and an infrared receiver. The display panel is provided in the body portion. The lens module is disposed in front of the display panel, and includes an outer frame, a lens and a mounting portion. The lens is provided in the outer frame. The mounting portion is disposed at the periphery of the outer frame. A reference line is connected between the viewing point and the mounting portion. The infrared transmitter is disposed on the mounting portion. The outer frame is provided with a light exit surface between the viewing point and the mounting portion. The infrared transmitter projects a light along the reference line via the light exit surface which limits the exit angle of the light. The infrared receiver is disposed on the body portion for receiving the light.

7 Claims, 3 Drawing Sheets

HEAD MOUNTED DISPLAY

This application claims the benefit of Taiwan application Serial No. 107100578, filed Jan. 5, 2018, the subject matter of which is incorporated herein by reference.

BACKGROUND OF THE INVENTION

Field of the Invention

The invention relates in general to a head mounted device, and more particularly to a head mounted display (HMD).

Description of the Related Art

Virtual reality (VR) is a computer technology which creates a 3D simulated space providing the viewer with visual and audial simulation and making the viewer feel as if he or she were personally in the scene. Most of the current VR devices are mainly focused on visual simulation. The VR devices achieve 3D vision by simulating human eyes' parallax through two split frames corresponding to the left-eye viewing angle and the right-eye viewing angle of the viewer. The left-eye viewing angle and the right-eye viewing angle are slightly different from each other.

Furthermore, in order to track the viewer's eye balls, current VR devices have an infrared transmitter provided at the periphery of the lens for projecting the infrared light on the human eyes. Due to the infrared light in the viewing environment surrounding the lens, the viewer will receive a large volume of infrared light when rotating his/her eye balls to view the images. Thus, the viewing quality of the VR devices and the viewer's comfort greatly deteriorate and need to be improved.

SUMMARY OF THE INVENTION

The invention is directed to a head mounted display for improving the viewing quality.

According to one embodiment of the present invention, a head mounted display including a body portion, a display panel, a lens module, an infrared transmitter and an infrared receiver is provided. The display panel is provided in the body portion. The lens module is disposed in front of the display panel. The lens module includes an outer frame, a lens and a mounting portion. The lens is provided in the outer frame, and has a central axis having a viewing point thereon. The mounting portion is disposed at the periphery of the outer frame. A reference line is connected between the viewing point and the mounting portion. The infrared transmitter is disposed on the mounting portion of the lens module. The outer frame is provided with a light exit surface between the viewing point and the mounting portion. The infrared transmitter projects a light along the reference line via the light exit surface, which limits the exit angle of the light. The infrared receiver is disposed on the body portion for receiving the light.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1:
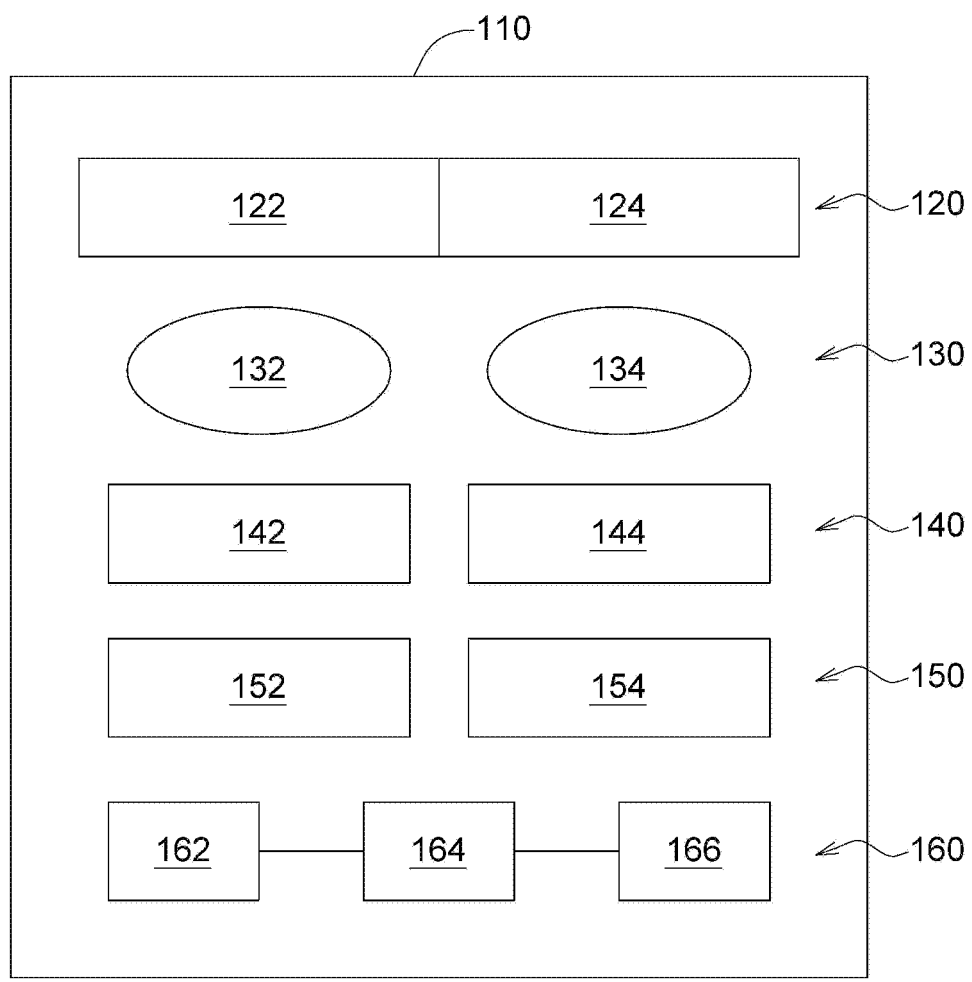
FIG. 1 shows a block diagram of a head mounted display according to an embodiment of the present invention.
Figure 2A:
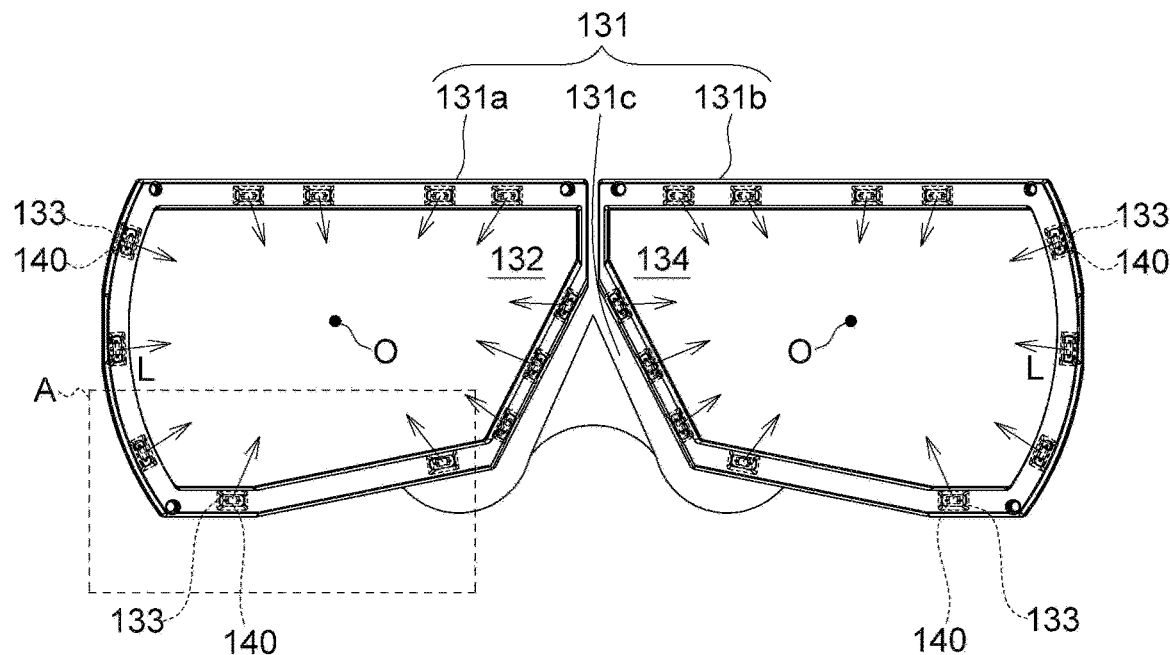
FIG. 2A shows an external view of a head mounted display according to an embodiment of the present invention.
Figure 2B:
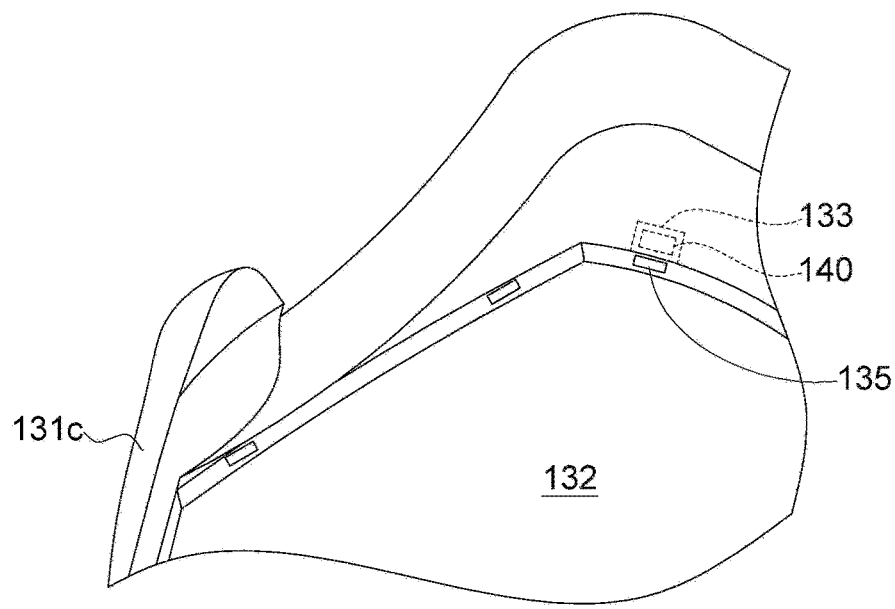
FIG. 2B shows a partial external view of region A of the head mounted display of FIG. 2A.

FIG. 1 shows a block diagram of a head mounted display 100 according to an embodiment of the present invention. FIG. 2A shows an external view of a head mounted display 100 according to an embodiment of the present invention. FIG. 2B shows a partial external view of region A of the head mounted display 100 of FIG. 2A.

Refer to FIG. 1, the head mounted display 100 according to an embodiment of the present invention includes a body portion 110, a display panel 120, a lens module 130, an infrared transmitter 140, an infrared receiver 150 and a data control unit 160. In an embodiment, the display panel 120 is provided in the body portion 110, and includes a left-eye display panel 122 and a right-eye display panel 124 for displaying a left-eye image and a right-eye image respectively. The lens module 130 is disposed in front of the display panel 120, and includes a left-eye lens 132 and a right-eye lens 134 for projecting the left-eye image and the right-eye image to the viewer's left eye and right eye respectively.

Additionally, the infrared transmitter 140 is disposed on the lens module 130, and includes a left-eye infrared transmitter 142 and a right-eye infrared transmitter 144 for emitting a light to the viewer's left eye and right eye respectively. The infrared receiver 150 is disposed on the body portion 110, and includes a left-eye infrared receiver 152 and a right-eye infrared receiver 154 for receiving the light reflected via the viewer's left eye and right eye respectively. In an embodiment, the lights reflected via the viewer's left eye and right eye respectively are reflected to the infrared receiver 150 via the display panel 120. In the present embodiment, the light reflected to the infrared receiver 150 can be converted into an image signal which is then transmitted to the control terminal for the use of determining the position of the viewer's pupil and tracking the viewer's eye balls.

In an embodiment, the data control unit 160 includes a data transmission interface 162, a display controller 164 and a movement sensor 166. The head mounted display 100 can be connected to a control terminal (such as a computer host) through the data transmission interface 162 for transmitting the dynamic data of the eye balls to the control terminal for tracking the viewer's eye balls. Moreover, the head mounted display 100 can obtain the to-be-displayed image data (such as the left-eye image and the right-eye image) through the data transmission interface 162. The image data can be displayed on the display panel 120 by the display controller 164. Furthermore, the display controller 164 can calculate the viewer's head position and displacement according to the data detected by the movement sensor 166, and then display corresponding image frames on the display panel 120.

Refer to FIGS. 2A and 2B. The lens module 130 includes an outer frame 131, a left-eye lens 132, a right-eye lens 134 and a mounting portion 133. In an embodiment, the outer frame 131 includes a left frame portion 131a and a right frame portion 131b, wherein the left-eye lens 132 is disposed in the left frame portion 131a and the right-eye lens 134 is disposed in the right frame portion 131b. The mounting portion 133 is disposed at the periphery of the left frame portion 131a and the periphery of the right frame portion 131b. Besides, a bearing portion 131c is provided between the left frame portion 131a and the right frame portion 131b for bearing the lens module 130 on the bridge of the viewer's nose.

In an embodiment, the mounting portion 133 can be made by a cavity for receiving the infrared transmitter 140. In FIG. 2A, the infrared transmitter 140 is hidden in the outer frame 131 and cannot be viewed from the external appearance. The infrared transmitter 140 is illustrated in dotted lines. The infrared transmitter 140 includes multiple light-emitting diodes, such as far infrared light-emitting diodes. The light-emitting diodes are provided at the periphery of the left-eye lens 132 and the periphery of right-eye lens 134, and each light-emitting diode projects a light L via its corresponding light exit surface 135.

Refer to FIG. 2B. At least a light exit surface 135 (multiple light exit surfaces are illustrated in the diagram) is provided on a lateral side of the outer frame 131 facing the viewing point O. The light exit surface 135 limits the exit angle of the light L projected via the light exit surface 135. Thus, the light L can only be projected on the viewer's left eye and right eye to avoid extra stray light being scattered in the viewing environment surrounding the lens.

Figure 3:
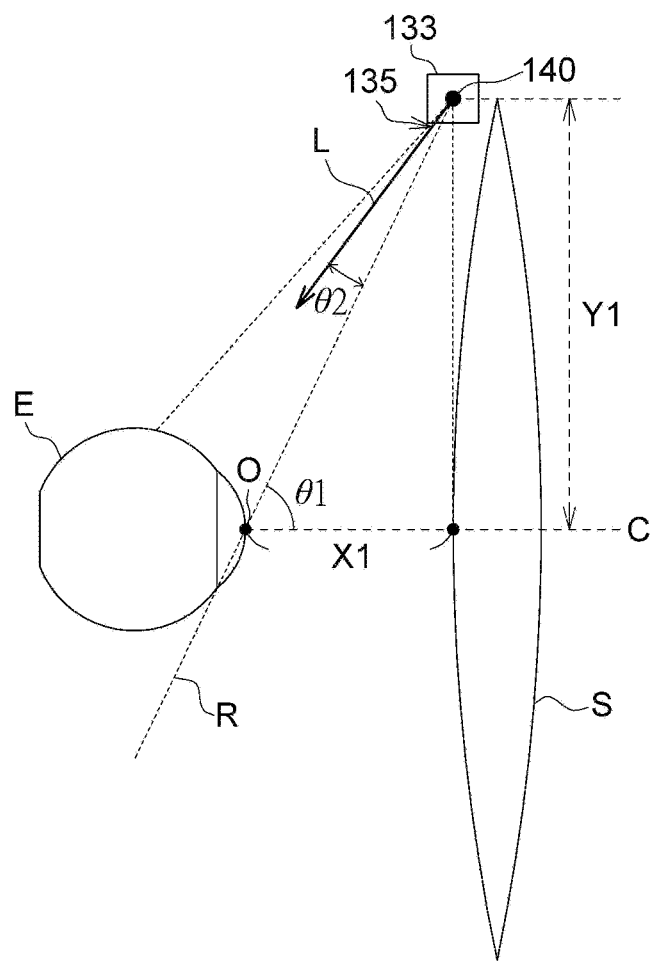
FIG. 3 shows relative positions between the human eye, the infrared transmitter and the lens.
Figure 4:
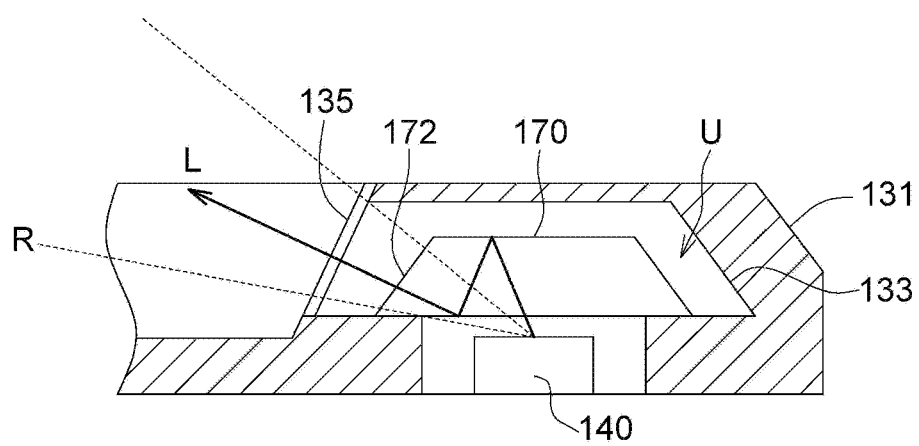
FIG. 4 shows a schematic diagram of an infrared transmitter disposed in a cavity.

FIG. 3 is a schematic diagram showing relative positions between a human eye E, an infrared transmitter 140 and a lens S. FIG. 4 shows a schematic diagram of an infrared transmitter 140 disposed in a cavity. Refer to FIG. 3. The lens S has a central axis C and a first radius Y1, wherein the central axis C has a viewing point O at which the object (such as the pupil of a human eye) is provided. The viewing point O and the lens are separated by a first distance X1 along the central axis C. The first distance X1 is such as an eye relief. A reference line R is connected between the viewing point O and the mounting portion 133. The central axis C forms an angle θ1 with respect to the reference line R. The angle θ1 is larger than or equivalent to the half apparent field of view being a half of the viewing angle at the viewing point O. The angle of the half apparent field of view can be obtained using the trigonometric function: $\tan^{-1}$ (the first radius Y1/the first distance X1).

In an embodiment, the first radius Y1 is in a range of 25 mm-35 mm, and the first distance X1 is in a range of 10 mm-16 mm. When the first radius Y1 is equivalent to 25 mm and the first distance X1 is equivalent to 10 mm, the half apparent field of view is approximately equivalent to 68°, but the present invention is not limited thereto. The angle of the half apparent field of view of the head mounted display 100 of the present embodiment can be adjusted according to actual needs.

As indicated in FIG. 3, the infrared transmitter 140 can project a light L along the reference line R. When the diameter of the pupil of the human eye E is considered in the calculation of the angle at which the light L is projected on the eye ball E, the exit angle θ2 of the projected light L with respect to the reference line R is in a range of 0-20°. Refer to FIG. 4. The infrared transmitter 140 is disposed in the cavity U, and projects a light L along the reference line R via the light exit surface 135, wherein the light exit surface 135 is disposed on a lateral side of the cavity U facing the viewing point O, and the light exit surface 135 is provided for limiting the exit angle θ2 of the light L with respect to the reference line R to a range of 0-20° to avoid extra stray light being scattered in the viewing environment surrounding the lens.

In the present embodiment, the head mounted display 100 further includes a light guide element 170 opposite to the infrared transmitter 140 and disposed in the cavity U. For example, the light guide element 170 is disposed above the infrared transmitter 140 for changing the exit angle θ2 of the light L. In an embodiment, the light guide element 170 is provided with a wedge plate having light guide function. For example, the wedge plate has a bevel 172 facing the light exit surface 135 for guiding the light L to the light exit surface 135 via the bevel 172. Besides, the light L can be reflected within the light guide element 170 several times before it is emitted via the bevel 172, such that the amount of light can be increased. Besides, the width of the opening of the light exit surface 135, the height of the infrared transmitter 140 and the angle of inclination of the light exit surface 135 with respect to the infrared transmitter 140 can be adjusted according to actual needs to change the exit angle θ2 of the light L.

According to the head mounted display disclosed in above embodiments of the present invention, an infrared transmitter is disposed in the cavity and the exit angle of the light projected via a light exit surface is limited, such that the light can only be projected to the viewer's left eye and right eye for tracking the viewer's pupils. Meanwhile, no extra stray light is scattered in the viewing environment surrounding the lens, and the viewing quality of the head mounted display is improved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head mounted display, comprising:
   a body portion;
   a display panel provided in the body portion;
   a lens module disposed in front of the display panel and comprising an outer frame, a lens and a mounting portion, wherein the lens is provided in the outer frame, and has a central axis having a viewing point thereon, the mounting portion is disposed at the periphery of the outer frame, and a reference line is connected between the viewing point and the mounting portion;
   an infrared transmitter disposed on the mounting portion of the lens module, wherein the outer frame is provided with at least a light exit surface between the viewing point and the mounting portion, the infrared transmitter projects a light along the reference line via at least a light exit surface, and the light exit surface limits an exit angle of the light, wherein the mounting portion is a cavity for receiving the infrared transmitter, and the light exit surface is disposed on a lateral side of the cavity facing the viewing point;
   a light guide element disposed above the infrared transmitter for reflecting the light and changing an exit angle of the light, wherein the light guide element is a wedge plate having a bevel facing the light exit surface for guiding the light to the light exit surface; and an infrared receiver disposed on the body portion for receiving the light.

2. The head mounted display according to claim 1, wherein the lens has a first radius, the viewing point and the lens are separated by a first distance along the central axis, and the reference line forms an angle larger than or equivalent to tan (the first radius/the first distance) with respect to the central axis.

3. The head mounted display according to claim 2, wherein the first radius is in a range of 25-35 mm, and the first distance is in a range of 10-16 mm.

4. The head mounted display according to claim 1, wherein the exit angle of the light with respect to the reference line is in a range of 0-20°.

5. The head mounted display according to claim 1, wherein the light guide element disposed in the cavity for guiding the light to the light exit surface.

6. The head mounted display according to claim 1, wherein the infrared transmitter comprises a plurality of light-emitting diodes surrounding the periphery of the lens, and each light-emitting diode correspondingly projects the light via the light exit surface.

7. The head mounted display according to claim 6, wherein an object is provided at the viewing point of the central axis, each light-emitting diode projects the light to the object, and the object reflects the light to the display panel.

\* \* \* \* \*